(12) United States Patent
Dybing

(10) Patent No.: US 8,080,276 B2
(45) Date of Patent: Dec. 20, 2011

(54) METHOD FOR PRODUCING A FOOD PRODUCT FROM A CONCENTRATED PROTEIN

(75) Inventor: Stephen T. Dybing, Harrisburg, PA (US)

(73) Assignee: Fonterra Co-Operative Group Ltd., Auckland (NZ)

( * ) Notice: Subject to any disclaimer, the term of this patent is extended or adjusted under 35 U.S.C. 154(b) by 1635 days.

(21) Appl. No.: 10/646,852

(22) Filed: Aug. 22, 2003

(65) Prior Publication Data

US 2004/0043124 A1    Mar. 4, 2004

(51) Int. Cl.
    *A23J 1/00*    (2006.01)
(52) U.S. Cl. ......... 426/656; 426/580; 426/586; 426/657
(58) Field of Classification Search .................. 426/580, 426/583, 586, 656, 657
    See application file for complete search history.

(56) References Cited

U.S. PATENT DOCUMENTS

| | | | |
|---|---|---|---|
| 4,650,690 A | 3/1987 | Bams et al. | |
| 5,006,349 A | 4/1991 | Dahlstrom et al. | |
| 6,096,352 A | 8/2000 | Kijowski et al. | |
| 6,139,901 A | 10/2000 | Blazey et al. | |
| 6,177,118 B1 | 1/2001 | Blazey et al. | |
| 6,183,804 B1 | 2/2001 | Moran et al. | |
| 6,358,551 B1 | 3/2002 | Sadowsky, IV et al. | |

FOREIGN PATENT DOCUMENTS

| WO | WO 00/51440 | 9/2000 |
|---|---|---|
| WO | WO 01/41578 A1 | 6/2001 |
| WO | WO 01/41579 A1 | 6/2001 |
| WO | WO 02/096208 A2 | 12/2002 |

OTHER PUBLICATIONS

"*Dairy Handbook*," Alfa-Laval AB, Lund, Sweden, (1980) pp. 253-258.
"*Processed Cheese Manufacture*," AJOHA Guide, BK Giulini Chemie GmbH & Co. OHG, Ladenburg, (1998) pp. 51-61.
P. Walstra and R. Jenness, "*Dairy Chemistry and Physics*," John Wiley & Sons, Inc., New York, (1984) p. 5.

*Primary Examiner* — Leslie Wong
(74) *Attorney, Agent, or Firm* — Knobbe Martens Olson & Bear LLP

(57) ABSTRACT

Improved processes for manufacturing cream, plastic cream, cream analogs, milk, milk analogs, and other food products from concentrated and/or dried protein and a suitable fat source are provided. Preferably, the protein is treated to enhance its ability to emulsify fat.

32 Claims, 2 Drawing Sheets

METHOD FOR PRODUCING A FOOD PRODUCT FROM A CONCENTRATED PROTEIN

FIELD OF THE INVENTION

The invention relates generally to the field of food processing and, more specifically, to improved processes for manufacturing food products from concentrated or dried ingredients.

BACKGROUND OF THE INVENTION

The ability to manufacture fluid products such as cream, milk, etc. from concentrated and dried ingredients significantly enhances processing flexibility. Such a process facilitates the operation of manufacturing plants at optimum capacity, particularly in areas unable to provide a sufficient or continuous milk supply. Producing fluid products from dry or concentrated ingredients also minimizes the shipping costs for transporting such ingredients, while eliminating the need to store such ingredients at refrigeration temperatures. Further, such a process permits the utilization of stockpiled surplus dry products such as nonfat dry milk, enhances the efficiency of producing products such as plastic cream, and creates effective components for standardizing milk.

Realizing the desired process requires the development of a successful procedure for rehydrating the protein supplied by the dried ingredients, simultaneously combined with a method for creating the desired emulsion. The manufacture of concentrated and dried ingredients both dehydrates the proteins and destroys the existing fat emulsion. Merely adding water to rehydrate the protein using conventional systems frequently is not sufficient to establish the desired fat emulsion needed to produce cream, milk, or related fluid products.

Emulsions are systems created by the dispersion of a liquid as droplets within another, otherwise immiscible liquid. All fats and oils, including milk fat, are inherently immiscible in water, so food emulsions are generally defined as "oil-in-water" or "water-in-oil" systems. The emulsion naturally occurring in milk and cream is a dispersion of milkfat droplets, 0.1 to 10 μm diameter, within the milk serum (Walstra and Jenness *Dairy Chemistry and Physics* John Wiley & Sons, New York p. 5, incorporated herein by reference). The milk serum is the portion of milk containing the water and the water-soluble components. The production of highly concentrated or purified milk fat products such as butter, clarified butter, ghee, anhydrous milk fat, various purified milkfat blends, etc., inherently destroys the natural milk fat emulsion.

Various types of high-pressure, high-shear mixers, such as homogenizers, create emulsions with physical force as a mixing agent. The effectiveness of these mixers is directly proportional to the amount of energy applied to the system to provide the required force. Hence, the quantity of fat that can be emulsified in a given amount of water and the size of the resulting droplets in the finished dispersion depends upon the amount of energy supplied by the mixer. Many mixers cannot supply enough energy or force to successfully emulsify the fat, particularly in high fat, low protein products, such as plastic cream.

Although high-pressure, high-shear mixers may initially create an emulsion, the ability to maintain that emulsion typically depends upon the action of emulsifiers. Emulsifiers are compounds that simultaneously interact with the two immiscible liquids, the water and oil, to reduce the interfacial tension. Compounds that are effective emulsifiers maintain two separate, independent molecular sections. One section of such molecules must be miscible in water, and is frequently defined as being "hydrophilic," while the other section must be miscible in oil or fat, and is termed "hydrophobic." This simultaneous interaction of the hydrophilic section in the water and the hydrophobic section in the oil or fat, positions the emulsifier at the interface between the oil and water, preventing the water and fat from separating back into independent phases.

Although several compounds are effective emulsifiers, legal regulations frequently prohibit the use of many of these compounds in the manufacture of most dairy and numerous food products. Many highly effective emulsifiers are not allowed in the manufacture of cheese varieties with a standard of identity, such as Cheddar, Mozzarella, Colby, Swiss etc. The only viable alternative is to create the required emulsion with allowed ingredients and/or with indigenous components. Proteins generally are the indigenous component most likely to effectively emulsify fat in the production of cream, milk, and related products.

Proteins that are effective emulsifiers rapidly diffuse to the interfacial area between the two immiscible liquids and partially denature, uncoiling to expose separate sections of predominantly hydrophilic and hydrophobic amino acids. The section of the protein primarily consisting of hydrophilic amino acids interacts with the water, while the section of the protein primarily consisting of hydrophobic amino acids interacts with the fat to create and maintain the emulsion. The effectiveness of specific proteins at emulsifying fat depends upon the possession of separate hydrophilic and hydrophobic sections of amino acids in the primary structure, the availability of a sufficient amount of protein, the solubility of the protein, and the protein's conformation, or shape.

Protein conformation is particularly critical to emulsification, as the protein must initially possess the separate hydrophilic and hydrophobic sections that are large enough to effect emulsification. The protein conformation subsequently must expose the proper amino acid section to the respective liquid, water or oil. Native proteins inherently position the hydrophilic sections to interact with water. However, the native conformation of most proteins minimizes the exposure of the hydrophobic amino acid sections to water. Such proteins may not be effective emulsifiers unless modified to promote the interaction of the hydrophobic sections with the oil.

Protein conformation is determined by the nature of chemical bonds and interactions. These bonds include covalent disulfide bonds, ionic bonds with various ions and salts, and hydrophobic/hydrophilic interactions with the solvent. The creation and maintenance of these bonds depends upon environmental parameters of the solution including the pH, temperature, pressure, overall ionic strength, and the identity of the ionic species. Controlled adjustments in these environmental parameters may therefore transform specified proteins into significantly more effective emulsifiers.

Modifications in protein conformation that enhance the ability of the protein to emulsify fat do not eliminate the need for high-shear mixing. Indeed, high-shear mixing, or homogenization, is still required to disperse the two immiscible components (fat and water). However, conformational modifications that transform proteins into superior emulsifying agents will proportionally enhance the ability of the high-shear mixing to produce emulsions, reduce the amount of shear needed to create an emulsion, increase the ability of the system to maintain the desired emulsion, and minimize the amount of protein needed to emulsify a specified quantity of fat or oil. The desired changes in protein conformation may facilitate the formation of emulsions that can not be produced and maintained by shear forces alone, such as the production of plastic cream.

Milk proteins constitute a primary protein source for emulsifying fat in many food products. Solubility differences at pH 4.6 divide the milk proteins into two major groups, the caseins and the whey proteins. The whey proteins are a mixture of globular proteins that remain soluble at pH 4.6 and account for about 20% of the total milk protein. The caseins are a group of phosphoproteins that precipitate from raw skim milk at pH 4.6, and comprise the remaining 80% of the milk proteins.

Caseins in general, and β-casein in particular, possess a highly discrete distribution of hydrophilic and hydrophobic amino acids that favors emulsification. However, most of the casein in milk is bound together as colloidal particles, called micelles, with significant amounts of insoluble calcium or magnesium phosphate salts. The aggregation of caseins into the micelle structure significantly limits the ability of the individual caseins to emulsify fat, effectively negating the favorable amino acid distribution in the primary structure of these proteins. Replacing the divalent cations calcium and magnesium in casein micelles with an appropriate monovalent cation, such as sodium, releases individual caseins as sodium salts. Such caseins are excellent emulsifiers. That is, the modification of casein conformation that occurs when the micelles are transformed to produce independent casein salts with monovalent ions significantly increases the ability of these proteins to emulsify fat. Berger et al. illustrate this principle in describing the use of emulsifying salts to enhance the emulsifying ability of casein in process cheese manufacture (Berger et al. *Processed Cheese Manufacture: A JOHA Guide* BK Giulinin Chemie GmbH Co. OHG, Ladenburg pp. 51-61).

SUMMARY OF THE INVENTION

In one aspect, the present invention provides improved processes for producing food products from concentrated protein sources.

According to one embodiment, concentrated protein is mixed with water to form a hydrated protein solution. The concentrated protein preferably comprises a milk protein, such as casein. In a particular embodiment the protein is nonfat dried milk.

The hydrated protein solution is mixed with a concentrated fat and emulsified to form a first food product. They may be mixed, for example, in a high shear mixer or in a high pressure homogenizer to form an emulsion.

The concentrated fat preferably comprises milk fat, and more preferably comprises about 50% to about 100% milk fat, more preferably about 95% milk fat.

In one embodiment the first food product is a dairy product, such as cream. The first food product may be combined with one or more additional ingredients to form a second food product.

In one embodiment the first food product is cream, which is combined with milk to form a second food product. The resulting second food product may in turn be used to make cheese.

The protein used in the process is preferably treated to enhance its ability to emulsify fat in water. The treatment may cause a conformational change in the protein that enhances its ability to emulsify fat.

In one embodiment treating the protein comprises adjusting the ionic composition of the hydrated protein solution. This may be done by adjusting the ionic composition of the water prior to mixing. Preferably, the ionic composition is adjusted by adding a monovalent salt, such as sodium chloride.

In another embodiment, treating the protein comprises adjusting the pH of the hydrated protein solution. Preferably, the pH is adjusted to between about pH 8.5 and about pH 12.

DETAILED DESCRIPTION OF THE PREFERRED EMBODIMENT

Figure 1:
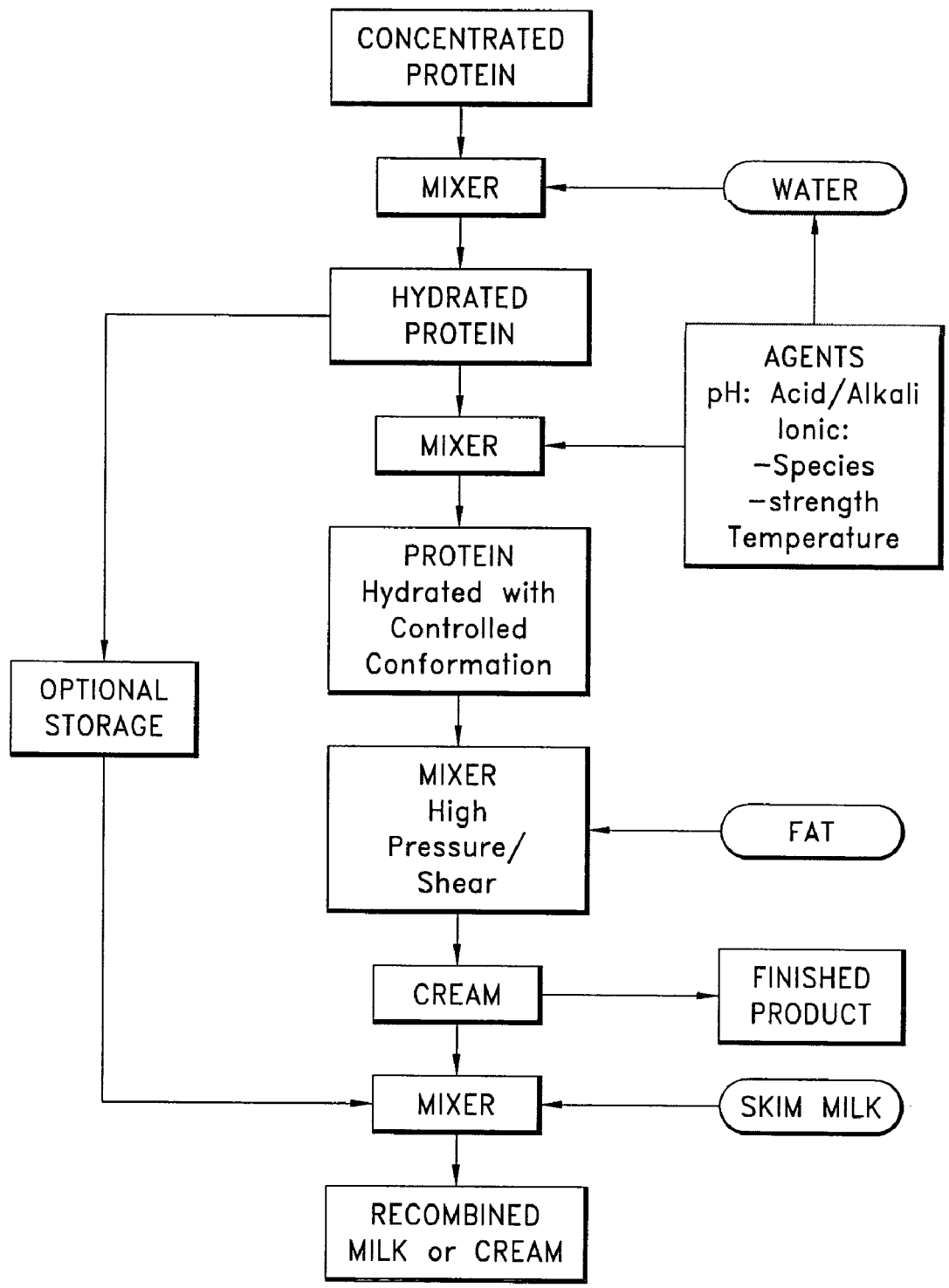
FIG. 1 is a flowchart of a method of reconstituting a concentrated food protein into a desired form for consumption, in accordance with a preferred embodiment of the present invention.

The present invention provides processes for preparing food products from concentrated or dehydrated ingredients, including proteins and fats. Food products prepared by the disclosed methods are also provided. Although described primarily with respect to milk and milk products, such as cream, one of skill in the art will recognize that the processes can be readily adapted to other types of food products, such as processed meats. The food products can be used directly, for example as fluid, market milk-type products, or they can be used as ingredients in the manufacture of other products such as, without limitation, ice cream, yogurt, cheese, butter, confections, milk chocolate, sauces, fillings, gravies and processed meat products. In some embodiments alternative fats, such as vegetable oils are used to produce analog food products such as cream analogs, milk analogs, or related products.

The terms "concentrated," "concentrated ingredient," "concentrated or dehydrated ingredients" and "concentrated or dried ingredients" are used broadly and include concentrated and/or dehydrated ingredients of any type. Preferred concentrated or dehydrated ingredients include both protein products and fat products.

Concentrated or dried protein products are typically produced by concentrating and/or dehydrating protein sources. For example, these products can be produced by concentrating and/or drying protein sources such as whole or skimmed milk. Concentrated or dried protein products that may be used include, without limitation, condensed milk, condensed skim milk, dry whole milk, nonfat dry milk, buttermilk powder, and milk protein concentrates, such as those produced by ultrafiltration (UF), whey protein concentrates, whey protein isolates, and total milk protein. The proteins may also be fractionated as desired during processing.

While the preferred embodiments are described in terms of the use of milk proteins, in other embodiments non-milk proteins are utilized. For example, and without limitation, the protein portions from soy beans, legumes, eggs, grains, such as oats, leaf sources, meats, fish or single celled microorganisms, such as algae, may be used as protein sources to produce concentrated or dehydrated protein products. Further, proteins from more than one source may be combined in a single food product.

Concentrated or dehydrated protein can be produced by any of numerous procedures known in the art. These methods include, but are not limited to molecular sieving by membrane filtration, gel filtration, UF, ion exchange, electrodialysis, and precipitation of the proteins by heat treatments, pH adjustment, or enzymatic proteolysis. With respect to milk products, well known processes for separating the moisture, lactose, and desired milk salts from milk proteins may be used. In one embodiment milk proteins are precipitated as a curd and subsequently separated from the remaining fluid milk components. An exemplary procedure for manufacturing total milk protein is disclosed in U.S. Pat. No. 6,139,901, incorporated herein by reference.

In some embodiments a concentrated protein solution for use in the processes disclosed herein is prepared from a previously dehydrated, milk-derived protein source such as, without limitation, nonfat dry milk, milk protein concentrate, sodium caseinate, potassium caseinate, calcium caseinate, rennet casein, whey protein concentrate, whey protein isolate, total milk protein, milk protein isolates and the like.

In other embodiments milk protein concentrates are used in which the calcium contents have been modified by ion exchange as described, for example, in WO 01/41578 and WO 01/41579, or modified to enhance solubility as described, for example, in WO 02/096208, each of which is incorporated herein by reference.

In some embodiments the concentrated proteins are fractionated as desired. For example, dried casein fractions are prepared and used as a protein source in some embodiments. Processes for fractionating proteins, including milk proteins, are well known in the art.

In the preferred embodiments, the proteins are treated to enhance their ability to form an emulsion with fat. The proteins may be treated at any time, including prior to drying or concentrating, during hydration, after hydration, and/or after combining with the fat. Enhancement of the ability to form an emulsion with fat can be determined by comparing the amount of fat that can be emulsified by untreated proteins to the amount of fat that can be emulsified by the same type of proteins that have received the treatment. Measures of the ability of proteins to form an emulsion are well known in the art and are described, for example, in Chftel et al. (*Amino acids, peptides and proteins*, Food Chemistry, $2^{nd}$ Ed. O. F. Fennema ed. Marcel Dekker, Inc., New York (1985)), incorporated herein by reference in its entirety. One widely used analytical procedure that can be used to evaluate the emulsions is a test of emulsion capacity (EC). The emulsion capacity is the volume of oil or fat that is emulsified per gram of protein before phase inversion occurs. Briefly, in this procedure an aqueous or saline solution or dispersion of the protein is stirred while oil or melted fat is added continuously at constant speed. Phase inversion can be detected, for example, by a sudden drop in viscosity, a change in color, or an increase in electrical resistance. Another measure that can be used to evaluate a treatment for the enhancement of proteins ability to emulsify fat is a measure of emulsion stability (ES). The volume of an initial emulsion is measured, the emulsion is allowed to stand or is centrifuged for a specified period of time and the volume of the remaining emulsion is measured. ES is given as the volume of the final emulsion divided by the volume of the initial emulsion multiplied by 100. Thus, in one embodiment the protein treatment is said to increase the ability of the protein to emulsify fat if it increases the EC or ES compared to untreated protein.

The way in which the proteins are treated to enhance their ability to emulsify fat is not limited in any way. For example, the system pH, temperature, pressure and/or overall ionic strength may be adjusted to enhance the ability of the protein to emulsify fat. In some embodiments the emulsion is enhanced by manipulating the identity of the ionic species, such as through ion exchange. In still other embodiments, the proteins are treated with enzymes. For example, in one embodiment, the proteins are treated with one or more proteases to cleave the protein into forms that that act as superior emulsifiers. A suitable protease can be selected by the skilled artisan, and the identity of the protease is not limited in any way, so long as the protease treatment enhances the ability of the protein to emulsify fat. Preferred proteases include trypsin (EC 3.4.21.4), plasmin (EC 3.4.21.7), papain (3.4.22.2), pepsin (EC 3.4.23.1), chymosin (3.4.23.4), and cathepsin D (EC 3.4.23.5). Other preferred proteases include protease preparations, such as rennin, rennet, plant proteases such as *Cynara cardunaculus* and microbial rennets including *Muchor miehei, Mucor pusillus* Lindt, *Cryphonectria parasitica, Bacillus cereus* and *Bacillus subtilis*. Preferably, the treatment modifies the protein conformation to enhance the ability of the protein to emulsify free fat.

In one embodiment the proteins are treated by adjusting the pH of the hydrated protein. The pH is controlled by the addition of food grade acids, buffers, and/or alkali agents.

The term "acid" describes both mineral and organic acids. Preferred acids are selected from those typically used in food manufacture, including, for example, phosphoric, hydrochloric, sulfuric, acetic, citric, propionic, lactic, tartaric and malic acid.

The term "buffers" describes food grade additives that are used to maintain a specific pH. Any such additive may be used in the present methods. Common food grade buffers that may be used include, but are not limited to, phosphate, citrate, and carbonate salts.

The term "alkali agents" describes food grade additives for increasing the system pH. Alkali agents that may be used in the present invention include, but are not limited to, alkali phosphates such as trisodium phosphate, lye, and suitable hydroxides such as sodium hydroxide, calcium hydroxide, potassium hydroxide, and ammonium hydroxide.

The system temperature and pressure may be adjusted as required using standard equipment and techniques for heating, cooling, and processing fluid products.

The overall ionic strength and ionic species are controlled by the addition of salts that will dissociate into the solution and provide the desired ions. Appropriate salts include, for example and without limitation, sodium chloride, potassium chloride, calcium chloride and salts of various polyvalent acids. Suitable salts also includeo monovalent salts of tartrate, citrate and orthophosphate.

The term "concentrated fat" broadly describes products produced by concentrating one or more fats and/or oils. The preferred embodiments use concentrated fats produced or obtained from milk or cream and include, for example and without limitation, anhydrous milk fat, ghee, butter, clarified butter, frozen plastic cream, and concentrated milk fat blends. In one embodiment milk fat blends are used that comprise from about 50% to about 100% milk fat, more preferably about 95% milk fat, and even more preferably about 95% anhydrous milk fat.

In other embodiments the concentrated fat is produced from a suitable fat or oil derived from a source other than milk or cream, such as a vegetable, animal, and/or microbial sources. For example, the concentrated fat may be produced from one or more sources selected from the group consisting of legumes, soy beans, oil seeds, vegetable oils such as corn oil, lard, tallow, fish oils, and single-celled microorganisms.

A method for preparing a food product from a concentrated or dehydrated protein is illustrated in FIG. 1. In the process, the concentrated or dehydrated proteins are hydrated by the addition of water with mixing. As described in more detail below, the hydrated protein mixture is treated to increase the ability of the proteins to emulsify fat, preferably due to the resulting modifications to the conformation of the proteins in the mixture. In the preferred embodiment, one or more of the temperature, pressure, pH, ionic strength and/or ionic composition of the hydrated protein mixture are manipulated. These factors may be manipulated by adjusting the temperature, pressure or composition of the water that is added to the concentrated protein. Alternatively, the temperature, pressure, pH, ionic strength and/or ionic composition of the protein solution may be adjusted subsequent to hydration, either prior to mixing the hydrated protein solution with the fat, or after mixing with the fat and prior to formation of the emulsion. As discussed above, the pH may be adjusted by addition of acids, buffers and/or alkali agents, and the ionic strength and composition may be adjusted by the addition of salts.

One or more suitable concentrated and/or dehydrated protein sources are selected and/or prepared. Suitable proteins preferably possess separate sections of hydrophilic and hydrophobic amino acids in their primary structure. Additionally, both of these individual sections of hydrophobic and hydrophilic amino acids are preferably large enough to facilitate the desired emulsification.

A preferred embodiment of the invention employs dehydrated milk protein. Preferably from about 50 to 100%, more preferably from about 75 to 80% of the dehydrated milk protein is micellular casein. Preferred sources of dehydrated protein therefore include nonfat dry milk, dried total milk protein products, and dehydrated milk protein concentrates comprising from about 40% to about 80% milk protein, including particular milk protein concentrates comprising 42%, 56%, 70%, and 80% milk protein, respectively. In other embodiments the preferred dehydrated protein source comprises dehydrated casein products, for example one or more dehydrated casein products selected from the group consisting of acid casein, rennet casein, sodium caseinate, calcium caseinate, and potassium caseinate.

In the process illustrated in FIG. 1, the protein is hydrated prior to mixing with concentrated fat. Hydration nominally is accomplished by merely dispersing the dry or concentrated protein into the desired amount of potable water. For example, feeding the powder into a powder-blending funnel positioned at the head of a centrifugal pump is the typical procedure for producing such dispersions (Dairy Handbook. Alfa-Laval AB Lund, Sweden, pp. 253-258 (1980), incorporated herein by reference). However, merely dispersing dehydrated proteins into water frequently does not yield rehydrated proteins with the desired ability to form an emulsion with the fat, because the process of dehydration disrupts protein conformation by eliminating the hydrophilic and hydrophobic interactions that established and maintained the original conformation.

The preferred process of hydration enhances the ability of the protein to emulsify the fat by facilitating the restoration and/or modification of the protein conformation during protein hydration. Preferably, the water used for hydration is subject to one or more manipulations that are capable of modifying protein conformation, including changing the system pH, temperature, pressure, overall ionic strength, and the identity of the ionic species. The optimum manipulations of the water used for hydration depends upon the identity of the dehydrated protein.

When the protein comprises caseins, particularly preferred alterations in protein conformation include the conversion of micellular casein in the protein solution to sodium caseinate. Thus, in one embodiment when the protein sources are dehydrated dairy products comprising significant amounts of casein, the protein is preferably treated by adjusting the pH of the hydration water, prior to hydration, to a pH of about pH 6 to about pH 12. More preferably, the pH of the hydration water is adjusted to about pH 8.5 to about pH 12. The higher pH causes the casein micelles to disperse, creating individual casein proteins that are better able to emulsify fat. In another embodiment the pH of the protein solution is adjusted after hydration of the protein.

Preferably, the pH is adjusted with one or more alkali or buffering agents. In one embodiment the agents are selected from the group consisting of monovalent citrate and phosphate buffering salts More preferably, the pH is adjusted with one or more agents selected from the group consisting of sodium orthophosphate and trisodium citrate salts.

In one embodiment, the pH is adjusted back to the typical pH of cream and milk of 6.6 to 6.8 upon the production of the desired emulsion.

In another embodiment the protein is treated to facilitate the emulsion by adjusting the temperature of the water used for hydrating the protein. Preferably, prior to hydration the temperature of the hydration water water is adjusted to about 40 to about 185° F. (5 to 85° C.). More preferably, the water temperature is adjusted to about 122 to about 180° F. (50 to 82° C.) and most preferably to about 140 to about 180° F. (60 to 82° C.). In another embodiment the temperature of the hydrated protein solution is adjusted as described above.

The ionic strength and/or ionic composition may also be adjusted to facilitate formation of the emulsion. In a preferred embodiment a salt, preferably a monovalent salt, is added to the water for hydration prior to mixing with the protein or the hydrated protein solution after mixing. If the protein comprises micellular casein, sodium chloride (NaCl) is preferably added to the water for hydration or to the hydrated protein solution. The addition of sodium chloride is also preferable if buffering salts cannot be used in the manufacture of the cream and/or if the protein does not comprise sodium caseinate.

In a preferred embodiment, the salt, such as sodium chloride, is added to the hydration water at a concentration of about 0.25 to about 2.5%, and more preferably at a concentration of about 0.75 to about 1.5%. In another embodiment salt is added to the protein solution in an amount equivalent to about 2.5 to about 25 parts salt to 100 parts protein, and more preferably equal to about 5 to about 15 parts salt to 100 parts protein in the hydrated protein solution.

If prepared from a dehydrated protein source and potable water, the protein solution may be held at refrigeration temperatures for a sufficient length of time to facilitate the proper protein hydration without undue microbial growth.

The procedures for enhancing the ability of the proteins to emulsify fat, as described above, can also be employed after the proteins have been hydrated. For example, one or more of the temperature, pressure, pH, ionic strength, and identity of the ionic species in the protein solution can be adjusted as described above. In other embodiments, these procedures can be performed after mixing the hydrated protein solution with the fat, but prior to forming the emulsion.

The prepared protein fraction, which has been treated to enhance emulsification, is then combined with concentrated fat or oil to create the desired food product. In the production of milk products such as cream, the fat preferably comprises concentrated milk fat, and more preferably comprises anhydrous milk fat, ghee, butter, clarified butter, and/or a concentrated milk fat blend, such as a concentrated milk fat product comprising 95% anhydrous milk fat. In other embodiments, the concentrated fat or oil may comprise any suitable food grade fat or oil derived from vegetable, animal, or microbial source(s). The ratio of protein, water, and fat can be manipulated to produce a food product with the desired composition.

The minimum amount of protein needed to emulsify the fat depends upon the type of protein employed and the amount of fat to be incorporated into the food product. In the case where the food product is a milk product such as cream, the product will preferably comprise about 0.1% to about 10% milk proteins, more preferably from about 0.35% to about 4% milk proteins. The cream produced typically has a fat concentration of about 10% to about 90% fat, more typically from about 20% to about 80% fat. In one embodiment the milk protein comprises about 0.5% to about 3% micellular casein. In this embodiment a cream is preferably produced that has a fat concentration of about 35% to about 80% fat. Optionally, the cream or other food product can be formulated to contain more protein than required for emulsification of the fat, with the additional protein included, for example, to enhance the nutritional value or functional properties of the finished product.

In one embodiment cream comprising about 18% to about 35% fat is created. In other embodiments heavy cream comprising about 36% to about 45% fat, high fat cream with more than 46% fat, and plastic cream, a product containing approximately 80% milk fat and about 19% or less moisture are created. In a preferred embodiment cream is produced with 18 to 80% milk fat, and more preferably with 35 to 70% milk fat.

The mixing conditions emulsify the fat, thereby creating a blended product with the smooth, homogenous body and texture of cream. Preferably, the fat is tempered and is in a liquid state before being mixed with the prepared protein solution. Thus, in one embodiment milk fat is melted at a temperature that facilitates emulsification within the blending system. More preferably, concentrated milk fat is heated to a temperature between about 104° F. and about 122° F. (approximately 40° C. to 50° C.) and most preferably, the fat or oil is heated to between about 104° F. and about 113° F. (about 40° C. to 45° C.).

The mixing is preferably carried out with a suitable device for achieving high shear blending. Such devices are well known in the art and include, for example, a piston-type high-pressure homogenizer, as widely used in the dairy industry, and a sanitary in-line, high shear mixer. In one embodiment a standard piston-type, high pressure homogenizer is employed for mixing at a pressure between about 0 and about 2500 psi(g), and more preferably at a pressure between about 50 and about 1500 psi(g). In other embodiments the prepared protein solution and liquid fat source are combined in in-line high shear mixers (as made by a number of manufacturers) to produce a suitable emulsion. Preferably, the hydrated protein solution and concentrated milk fat are mixed together at a temperature between about 120° F. and about 158° F. (approximately 50 to 70° C.) and most preferably, the protein and fat will be combined at a temperature of about 140° F. (60° C.).

The cream or related product produced by the process may constitute the finished product. Optionally, the cream or related product may be combined with additional ingredients to form a different food product. For example, the cream may be combined with milk, skim milk, reconstituted milk, rehydrated protein/water mixtures, or potable water in a suitable ratio to produce a cream, milk, recombined milk, or related product with a different fat content. These fluid products may be marketed directly or may be used as ingredients for the manufacture of further dairy and food products.

In one embodiment cream prepared by the process illustrated in FIG. 1 is combined with milk, skim milk, or reconstituted skim milk in a suitable ratio to produce standardized milk for the manufacture of a desired cheese variety such as Cheddar, Mozzarella, Colby.

Figure 2:
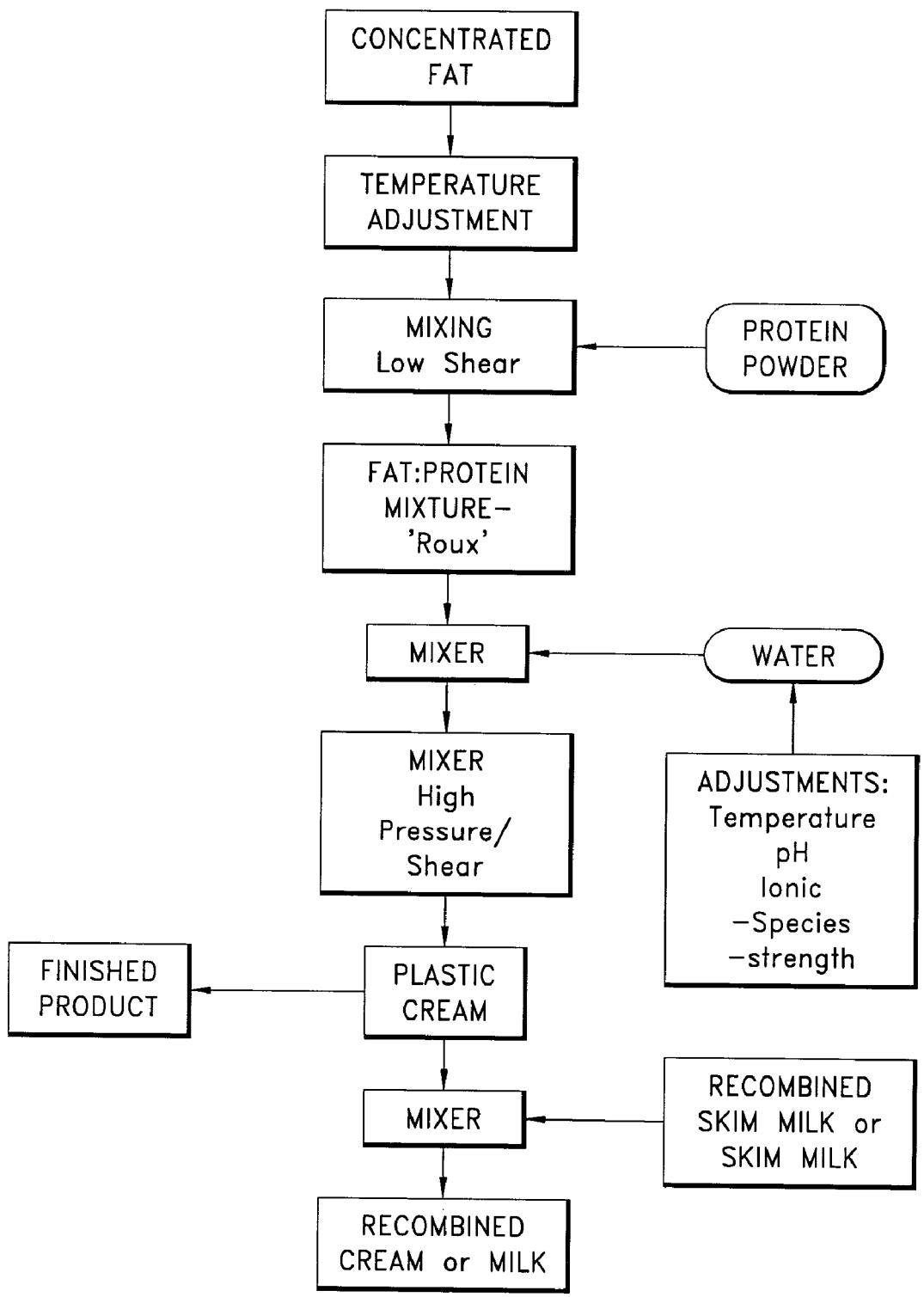
FIG. 2 is a flowchart of a method of reconstituting a concentrated food protein into a desired form for consumption, including steps analogous to roux production, in accordance with another preferred embodiment of the present invention.

A second method for preparing a food product from condensed or dehydrated ingredients is illustrated in FIG. 2. In the related embodiments concentrated or dehydrated protein is incorporated into concentrated fat or oil prior to hydration. The fat or oil is preferably tempered.

The protein sources that may be used in the process illustrated in FIG. 2 are the same as those described above with reference to the processes illustrated in FIG. 1.

The protein is preferably treated to enhance its ability to form an emulsification with the fat, such as by changing the conformation of the protein. Enhancement of the ability to form an emulsion can be measured as described above. In one embodiment, the temperature, pressure, pH, ionic strength and/or ionic composition of a protein solution is manipulated prior to concentration or dehydration to enhance the ability of the protein to emulsify fat, such as by modifying the conformation of the protein. In another embodiment, the mixing of the protein into the fat in the absence of water enhances the ability of the protein to form an emulsion by producing a desirable modification in protein conformation. In a further embodiment enzymes, such as proteases, are used to enhance the emulsion. In a preferred embodiment the temperature, pressure, ionic strength or ionic composition of water that is added to the fat/protein mixture, as described below, is manipulated to enhance the formation of an emulsion.

The dry protein/fat mixture is termed a "roux" because its appearance resembles the appearance of a "roux" produced from flour and oil as used in cooking. Water, preferably modified to enhance the emulsification of the fat by the protein, is then added to the dry protein/concentrated fat mixture, or roux, with sufficient shear to produce a stable emulsion. In one embodiment a standard piston-type, high pressure homogenizer is employed for mixing at a pressure between 0 and about 2500 psi(g), and more preferably at a pressure between about 50 and about 1500 psi(g). In other embodiments the prepared protein/fat mixture and hydration water are combined within a suitable in-line mixer (as made by a number of manufacturers) to produce an emulsion.

When milk-derived proteins are used, the resulting product may be, for example, cream, heavy cream, high fat cream, or plastic cream. This may constitute the finished product. Alternatively, additional ingredients may be added, such as skim milk or rehydrated protein/water mixtures to produce cream with a lower fat content, milk or a related product with the desired composition.

Finished products produced by the approaches illustrated in FIGS. 1 and 2 are suitable for use as fluid cream and milk products, or as the related analog products. The finished products produced by these approaches are also suitable for use in the manufacture of other dairy and food products such as cheese, ice cream, sauces and the like.

In the process illustrated in FIG. 2 the dry protein component is mixed directly with the fat. Again, it is preferable to treat the protein to enhance the emulsification of fat and oil. This may be done prior to dehydration of the protein, during mixing of the protein with the fat, or after mixing, such as by adjusting the water for hydration, or adjusting the conditions of the ultimate hydrated protein/fat mixture.

In one embodiment, the appropriate agents can be used to treat the protein before the protein is dried. Following dehydration, the protein is combined with the fat as described below. As previously mentioned, the agents that can be used to treat the protein include system pH, temperature, pressure, enzymes, overall ionic strength, and the identity of the ionic species. A preferred embodiment of the process employees properly hydrated milk proteins, and more preferably, products in which about 75 to 80% of the hydrated protein is micellar casein. Particularly preferred alterations in protein conformation include the conversion of micellar casein in the protein solution to sodium caseinate.

In a particular embodiment the pH of the protein solution is adjusted to about pH 8.5 to about pH 12. When the protein comprises micellar casein, this adjustment causes the casein micelles to disperse and creates individual casein proteins and sodium caseinates with a superior conformation for emulsifying fat. The pH is adjusted with buffering agents or alkali agents, more preferably with monovalent citrate or phosphate buffering salts, and even more preferably the pH is adjusted with sodium based alkali agents, such as sodium orthophosphate or trisodium citrate salts.

In other embodiments a monovalent salt is added to the protein solution, and in a particular embodiment sodium chloride (NaCl) is added to the solution. The addition of sodium chloride is highly preferable if the buffering salts cannot be used in the manufacture of the cream or dehydrated protein product. In the preferred embodiment, sodium chloride is added to the protein solution at 0.25 to 2.5%, and more preferably at 0.75 to 1.5%. Alternatively, the amount of sodium chloride added to the water preferably is equivalent to 2.5 to 25 parts salt to 100 parts protein, and more preferably, equal to 5 to 15 parts salt to 100 parts protein in the hydrated protein solution.

The treated protein solution is subsequently dried or concentrated by standard procedures.

In other embodiments the protein is treated after mixing with the fat. The second approach for achieving the desired enhancement of emulsification of fat, such as by modifications in protein conformation, takes advantage of inherent changes that occur in the protein during the mixing of the dry protein with the fat or oil. Incorporating the dehydrated protein into the fat or oil without the interference of water allows the hydrophobic amino acids to uncoil and interact with the fat or oil, while folding the protein to shield the hydrophilic amino acids. These conformational changes enhance emulsification upon the subsequent addition of the water and hydration of the protein.

As mentioned above, the dry protein component used in the processes is preferably a dehydrated dairy protein product. More preferably the dry protein component comprises from about 50% to about 100% micellar casein, more preferably from 75 to 80% micellar casein. Preferred sources of dehydrated protein therefore include nonfat dry milk, dried total milk protein products, and dehydrated milk protein concentrates comprising from about 40% to about 80% milk protein, including particular milk protein concentrates comprising 42%, 56%, 70%, and 80% milk protein, respectively. In other embodiments the preferred dehydrated protein source comprises dehydrated casein products, for example one or more dehydrated casein products selected from the group consisting of acid casein, rennet casein, sodium caseinate, calcium caseinate, and potassium caseinate. Most preferably the dehydrated protein is sodium caseinate.

As above, for the production of milk products, the fat is preferably milk fat, and more preferably the milk fat is anhydrous milk fat, ghee, butter, clarified butter, or a concentrated milk fat product that is essentially moisture free. In one embodiment the fat is a concentrated milk fat product comprising about 50% to about 100% milk fat, more preferably about 95% milk fat and even more preferably about 95% anhydrous milk fat.

The temperature of the fat or oil is preferably adjusted to about 60° F. to about 140° F. (approximately 15 to 60° C.) prior to mixing with the dried or concentrated protein. More preferably, the milk fat has been tempered to a temperature of about 75° F. to about 122° F. (approximately 24 to 50° C.) and rendered into either a highly pliable, plastic solid product or a low temperature melted product. Most preferably the fat or oil will be tempered to about 104° F. to about 113° F. (40 to 45° C.). The dehydrated protein and fat or oil are uniformly blended together to produce a smooth, plastic mixture.

Following mixing of the dried protein and fat, sufficient hydration water is then added to the mixture in the proper ratio to produce either cream, heavy cream, high fat cream, or plastic cream with the desired composition. Besides standardizing the product to produce the desired finished composition, this water must hydrate the dehydrated protein.

The hydration step provides another opportunity to enhance the ability of the protein to emulsify fat. Thus, in another embodiment the hydration water is manipulated to enhance the ability of the protein, once hydrated, to emulsify the fat. In other embodiments the hydrated protein/fat mixture is manipulated subsequent to the addition of the hydration water. As described above, the preferred processes facilitate restoration and/or modification of the protein conformation during protein hydration or afterward by the judicious use of system pH, temperature, pressure, overall ionic strength, and the identity of the ionic species. Particularly preferred alterations in protein conformation include the conversion of micellar casein in the protein solution to sodium caseinate.

In one embodiment, the pH of the hydration water preferably is adjusted to about pH 8.5 to about pH 12 to disperse the casein micelles, creating individual casein proteins with a superior conformation for emulsifying fat. In another embodiment the pH of the hydrated protein/fat mixture is adjusted to about pH 8.5 to about pH 12 prior to forming the emulsion. The pH may be adjusted as described above. Upon producing the desired emulsion, the pH may be adjusted back to the typical pH of cream and milk of about pH 6.6 to about pH 6.8.

The temperature of the hydration water prior to mixing, and/or of the fat/dehydrated protein mixture is preferably heated to about 40° F. to about 185° F. (5 to 85° F.) and more preferably to about 104° F. to about 140° F. (approximately 40 to 60° C.). The temperature of the hydrated protein/fat mixture may also be adjusted to be in this range. The temperature adjustment is particularly preferred when the protein comprises sodium caseinate.

In some embodiments a salt, more preferably a monovalent salt, is added to the water for hydration prior to mixing with the protein/fat roux, or to the hydrated protein/fat mixture. The preferred salt is sodium chloride (NaCl). The addition of sodium chloride is preferred if the protein does not comprise sodium caseinate, and if the buffering salts cannot be used in the manufacture of the cream. In particular, the addition of NaCl to the water for hydration is preferred if the protein powder comprises micellular casein.

In a preferred embodiment, sodium chloride is added to the hydration water at a concentration of about 0.25 to about 2.5%, and more preferably at a concentration of about 0.75% to about 1.5%. In another embodiment the amount of sodium chloride added to the water or water/roux mixture is preferably equivalent to about 2.5 to about 25 parts salt to about 100 parts protein, and more preferably, equal to about 5 to about 15 parts salt to about 100 parts protein in the hydrated protein solution.

In one embodiment the dry protein/concentrated fat mixture, or roux, and hydration water are combined in a high pressure, piston-type homogenizer. In another embodiment the roux and water are mixed and subsequently passed through the homogenizer. The homogenizer is preferably operated at a pressure range of 0 to about 2500 psi(g) and more preferably at a pressure range of about 50 to about 1500 psi(g). In other embodiments in-line high shear mixers (as made by a number of manufacturers) are used to combine the prepared protein solution and fat source to form a suitable emulsion.

Preferably, the mixing is carried out at a temperature between about 120° F. and about 158° F. (approximately 50 to 70° C.) and more preferably at a temperature of about 140° F. (60° C.).

The cream or related product may constitute the finished product. Optionally, the cream or related product may be combined with additional ingredients, such as milk, skim milk, reconstituted milk, rehydrated protein/water mixtures, or potable water in a suitable ratio to produce a cream, milk, recombined milk, or related product with a different fat content. Preferably, the cream and skim milk are mixed together by techniques that are well known in the art, such as by metering pumps or by low shear, propeller-bladed system. These fluid products may be marketed directly or used as ingredients for the manufacture of other dairy and food products.

In one embodiment cream prepared by a process of the invention is combined with milk, skim milk, or reconstituted skim milk in a suitable ratio to produce a standardized milk for the manufacture of a desired cheese variety such as Cheddar, Mozzarella, Colby, Swiss, etc.

Example 1

High fat cream with 70% milk fat was produced using the process illustrated in FIG. 1. Initially, 135 gal (approximately 1120 lb.) of potable water was heated to 160° F. (71° C.) and combined with 15 lb. of sodium chloride, while receiving sufficient agitation to completely dissolve the sodium chloride. A powder funnel, centrifugal pump system was then used to disperse 385 lb. of nonfat dry milk into the water-sodium chloride solution while being transferred through the pump to a storage tank. The reconstituted skim milk mixture was immediately combined with 4290 lb. (2 metric ton) of a concentrated milk fat product comprising about 95% anhydrous milk fat and about 5% buttermilk powder (NZMP (USA), Inc. Lemoyne, Pa.), which had been heated to 104° F. (40° C.). Maintaining sufficient agitation to produce a uniform mixture, the combined product was homogenized in a standard high pressure, piston-type homogenizer at 900 psi (g) in two stages, with the first stage set at 450 psi(g) and the second stage set at 450 psi(g). The temperature of the mixture at homogenization was 140° F. (60° C.) due to loss of heat through the system. Upon passage though the homogenizer, the process produced a high fat cream with 70.1% fat and the body and texture of comparable products, such as plastic cream. The high fat cream was immediately combined with 930 gal. (approximately 7750 lb.) of potable water at 140° F. to produce a cream of 30% fat. The physical properties of the 30% fat cream were identical to 30% fat cream produced from fresh milk by the traditional process. Table 1 shows the composition of the reconstituted nonfat dry milk and salt, prepared high fat cream of 70% fat, and 30% fat cream.

TABLE 1

Composition of the reconstituted nonfat dry milk (NDM) and salt, the prepared high fat cream (70%) produced by the process, and the prepared cream at 30% fat.

| Component | Reconstituted NDM and Salt -%- | Prepared High Fat Cream 70% Fat -%- | Prepared Cream 30% Fat -%- |
|---|---|---|---|
| Moisture | 74.5 | 19.8 | 65.6 |
| Total Solids | 25.5 | 80.2 | 34.4 |
| Fat | 0.2 | 70.2 | 30.1 |
| Total Protein | 9.2 | 3.6 | 1.6 |
| Casein | 7.2 | 2.8 | 1.1 |
| Salt (NaCl) | 0.25 | 0.11 | 0.006 |

A 2,725 lb. portion of the 30% fat cream created by the process was combined with 14,065 lb. of fresh raw milk and 29,715 lb of reconstituted, condensed skim milk to produce 45,605 lb. of standardized milk. The composition of the standardized milk is presented in Table 2. The standardized milk was pasteurized at 165° F. (73.9° C.) for 18 sec. and processed to produce Romano cheese, generally following the procedure described by Kosikowski and Mistry (Cheese and Fermented Foods Volume II Procedures and Analysis, $3^{rd}$ Ed. F. V. Kosikowski LLC, Westport, Conn. pp. 83-84 (1997)).

Initially, about 46,500 lb. of standardized milk at 92° F. (33.3° C.) and a pH of 6.6 was transferred to a HCV Horizontal Cheese Vat (Scherping Systems, Winsted, Minn.) capable of holding 50,000 lb. milk. The milk was inoculated with separate Superstart® cultures consisting of *Lactovacillus delbrueckii* subsp. Bulgaricus and *Streptococcus thermophilus* (Rhodia Food (Dairy), Madison, Wis.) per the manufacturers instructions. Calcium chloride (28 oz.) was added to the vat 20 min. following starter addition, and 45 oz. of double strength rennet (Maxiren®, DMV Food Specialties USA, Menomonee Falls, Wis.) added one hour following starter addition. The curd was cut 25 min. following rennet addition, healed for 15 min, and cooked to 116° F. (47° C.) in 45 min. The curd was pumped over to a horizontal draining table (Damrow, Fond du Lac, Wis.) approximately 2 hr. after cutting, when the curd pH was 6.25. The curd was stirred and the pH allowed to decrease to 5.3 before being dry salted. The salted curd was hoped in 500 lb. barrels and pressed.

The composition of the standardized milk and the Romano produced with the cream made by the process are presented in Table 2, with the mean composition of 8 vats of Romano produced by the same facility with typical milk on the preceding manufacturing day. The Romano produced with the prepared cream was judged to be identical to the control product produced by the routine procedure, maintaining a composition, body, and texture that was within specification for this product.

TABLE 2

Composition of the standardized milk produced with the cream made by the process, the Romano cheese made with the standardized milk, and the mean composition of 8 vats of Romano made at the processing facility on the preceding processing day.

| Component | Standardized Cheese Milk -%- | Romano from Standardized Milk -%- | Romano Control[1] -%- |
|---|---|---|---|
| Moisture | 85.5 | 32.77 | 31.58 |
| Total Solids | 14.5 | 67.23 | 68.42 |
| Fat | 3.0 | 28.2 | 28.6 |

TABLE 2-continued

Composition of the standardized milk produced with the cream made by the process, the Romano cheese made with the standardized milk, and the mean composition of 8 vats of Romano made at the processing facility on the preceding processing day.

| Component | Standardized Cheese Milk -%- | Romano from Standardized Milk -%- | Romano Control[1] -%- |
|---|---|---|---|
| Salt | 0.006 | 2.64 | 2.48 |
| pH | 6.6 | 5.30 | 4.84 |
| FDB | NA | 41.93 | 41.76 |
| Whey Fat | NA | 0.16 | 0.20 |

[1]Mean of composition values for 8 vats of Romano produced typical milk at the same facility on the preceding processing day.

Example 2

The following example illustrates the process for producing plastic cream by the procedure illustrated in FIG. 2. Initially 3,837.4 g of a concentrated milk fat product containing 95% anhydrous milk fat and 5% buttermilk powder (NZMP (USA), Inc. Lemoyne, Pa.) was heated to 100° F. (37.8° C.). Approximately 500 g of this product removed and combined with 117.9 g of sodium caseinate (ALANATE™ 185, NZMP (USA), Inc., Lemoyne, Pa.) maintained at 75° F. (24° C.), and the mixture blended by hand stirring to produce a smooth paste. The dried sodium caseinate was prepared by treating a protein source comprising micellular casein source to disrupt casein micelles. Disrupting micellular casein effects the desired conformational modifications that enhance the ability of this protein to emulsify fat.

The remaining portion of the concentrated milk fat product (95% anhydrous milk fat, 5% buttermilk powder) and 580.6 g of potable water were independently heated to 140° F. (60° C.). The blended sodium caseinate/concentrated fat mixture and remaining milk fat were blended together into a smooth, uniform mix, and then the water was blended into the fat/sodium caseinate blend with vigorous hand stirring until the blend was uniformly blended and the protein hydrated.

The cream mixture was then heated to 140° F. and the mixture homogenized in a standard high-pressure homogenizer at 1000 psi(g) with the first stage and 500 psi(g) at the second stage for a total pressure of 1500 psi(g). The product passed through the homogenizer at 122° F. (50° C.), which produced the desired body and texture of plastic cream. The composition of the finished product was 80.45% fat, 13.1% moisture, 3.8% total protein, 2.2% lactose, and 0.4% ash. The plastic cream was as suitable for immediate use as commercially prepared plastic cream by the traditional methods.

The plastic cream is combined with fluid milk or analog product and/or prepared skim milk produced by reconstituting nonfat dry milk to produce cream, heavy cream, light cream, milk, or a milk or cream analog. Such products are suitable for use as fluid milk or analog products, or may be processed as desired into manufactured products such as ice cream, cheese, Cheddar cheese, pasteurized process cheese, yogurt etc., by standard processing procedures.

While the invention has been described with reference to certain preferred embodiments, it will be understood by those skilled in the art that various changes may be made and equivalents may be substituted for elements thereof without departing from the scope of the invention. In addition, many modifications may be made to adapt the teachings herein to a particular situation without departing from the essential scope of the invention. Therefore, it is intended that the invention not be limited to any particular embodiment disclosed, but that the invention will include all embodiments falling within the scope of the appended claims.

All patents and other publications referred to herein are hereby incorporated by reference in their entirety.

What is claimed is:

1. A method of producing a food product from concentrated protein comprising:
   mixing the concentrated protein with water to form a hydrated protein solution;
   adjusting the ionic composition of the hydrated protein solution to enhance its ability to emulsify fat in water as measured by at least one of increased emulsion capacity (EC) and increased emulsion stability (ES) in comparison to untreated protein, wherein the concentrated protein comprises concentrated milk protein; and
   mixing the hydrated protein solution with a concentrated fat to form a first food product.

2. The method of claim 1, wherein the first food product comprises high fat cream.

3. The method of claim 2, wherein the high fat cream comprises 70% fat or greater.

4. The method of claim 1, wherein the first food product comprises plastic cream.

5. The method of claim 4, wherein the plastic cream comprises about 80% fat.

6. The method of claim 1, further including adding an ingredient to the first food product in order to form a second food product.

7. The method of claim 6, wherein the additional ingredient is milk.

8. The method of claim 1, wherein the first food product is a dairy product.

9. The method of claim 8, wherein the first food product is cream.

10. The method of claim 9, wherein the cream is combined with milk to produce a second food product.

11. The method of claim 10, wherein the second food product is used to make cheese.

12. The method of claim 1, wherein the concentrated protein is a dehydrated protein.

13. The method of claim 1, wherein the concentrated protein comprises casein.

14. The method of claim 1, wherein the concentrated protein is nonfat dry milk.

15. The method of claim 1, wherein the concentrated fat comprises milk fat.

16. The method of claim 15, wherein the concentrated fat comprises about 95% milk fat.

17. The method of claim 1, wherein the ionic composition of the hydrated protein solution is adjusted by changing the ionic composition of the hydration water prior to mixing with the protein.

18. The method of claim 17, wherein the ionic composition of the water is adjusted by adding a monovalent salt to the water.

19. The method of claim 18, wherein the monovalent salt is sodium chloride.

20. The method of claim 18, wherein the monovalent salt is added to a concentration of about 0.25% to about 2.5%.

21. The method of claim 1, wherein the ionic composition of the hydrated protein solution is adjusted by adding a monovalent salt to the solution after mixing with water.

22. The method of claim 21, wherein the monovalent salt is sodium chloride.

23. The method of claim 21, wherein the monovalent salt is added to a concentration of about 5 parts salt to about 15 parts salt per 100 parts protein.

24. The method of claim 1, wherein the concentrated fat and hydrated protein are mixed in a high shear mixer or a high-pressure homogenizer.

25. A method of making cheese comprising:
mixing nonfat dry milk comprising milk proteins with water to form reconstituted skim milk, wherein the water comprises a monovalent salt prior to mixing;
combining the reconstituted skim milk with concentrated milk fat;
homogenizing the combined milk and fat to produce cream;
diluting the cream with milk to produce standardized milk; and using the standardized milk to make cheese.

26. The method of claim 25, wherein the water comprises from about 0.25 to about 2.5% of the monovalent salt.

27. The method of claim 26, wherein the monovalent salt is sodium chloride.

28. The method of claim 25, wherein the concentrated milk fat comprises about 95% anhydrous milk fat.

29. The method of claim 28, wherein the concentrated milk fat comprises about 5% buttermilk powder.

30. The method of claim 25, wherein the cream comprises more than 36% fat.

31. The method of claim 25, wherein the cream comprises high fat cream.

32. The method of claim 25, wherein the cream comprises plastic cream.

* * * * *